US010938997B2

(12) United States Patent
Yoshimoto et al.

(10) Patent No.: US 10,938,997 B2
(45) Date of Patent: Mar. 2, 2021

(54) IMAGE FORMING APPARATUS WITH FUNCTION FOR IDENTIFYING FAILURE PORTION

(71) Applicant: CANON KABUSHIKI KAISHA, Tokyo (JP)

(72) Inventors: Tetsuhiro Yoshimoto, Tokyo (JP); Shuji Obata, Noda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/666,228

(22) Filed: Oct. 28, 2019

(65) Prior Publication Data
US 2020/0145543 A1 May 7, 2020

(30) Foreign Application Priority Data

Nov. 5, 2018 (JP) .............................. JP2018-207948

(51) Int. Cl.
*H04N 1/00* (2006.01)

(52) U.S. Cl.
CPC ..... *H04N 1/00037* (2013.01); *H04N 1/00076* (2013.01); *H04N 1/00079* (2013.01); *H04N 1/00408* (2013.01); *H04N 1/00899* (2013.01)

(58) Field of Classification Search
None
See application file for complete search history.

(56) References Cited

U.S. PATENT DOCUMENTS

2007/0280720 A1    12/2007    Kimura .......................... 399/88

FOREIGN PATENT DOCUMENTS

EP    0602343    6/1994
JP    2005-237046    9/2005

OTHER PUBLICATIONS

Extended European Search Report dated Mar. 23, 2020 in counterpart EP Application No. 19206448.3.
U.S. Appl. No. 16/666,197, filed Oct. 28, 2019.

*Primary Examiner* — Lennin R Rodriguezgonzalez
(74) *Attorney, Agent, or Firm* — Venable LLP

(57) ABSTRACT

An image forming apparatus includes a plurality of functions for forming an image, which are implemented by a power supply, a signal output unit, a control circuit, and a load operation unit operating in cooperation with one another. The load operation unit includes a sensor for detecting an abnormality. When the sensor has detected an abnormality, the image forming apparatus identifies a failure portion being a cause of the abnormality by checking failure portions of the power supply and the signal output unit, checking a failure portion of the control circuit when there is no failure portion in the power supply and the signal output unit, and checking a failure portion of the load operation unit when there is no failure portion in the control circuit.

14 Claims, 8 Drawing Sheets

| | POWER SUPPLY | SIGNAL OUTPUT DEVICE | CONTROL CIRCUIT | LOAD OPERATION DEVICE |
|---|---|---|---|---|
| ROTARY POSITION CONTROL ABNORMALITY | +24V_B<br>+24V_B_FU | MOTOR CONTROLLER | MOTOR DRIVER | ROTARY DEVELOPING UNIT |
| CHARGING DC OUTPUT ABNORMALITY | +24V_A<br>+24V_A_FU | HIGH-VOLTAGE CONTROLLER | CHARGING DC HIGH-VOLTAGE DEVICE | CHARGING ROLLER |

IMAGE FORMING APPARATUS WITH FUNCTION FOR IDENTIFYING FAILURE PORTION

BACKGROUND OF THE INVENTION

Field of the Invention

The present disclosure relates to a technology of identifying, when an abnormality has occurred in operation of an image forming apparatus such as a copying machine or a printer, a failure portion being a cause of the abnormality.

Description of the Related Art

An image forming apparatus is configured to form an image on a sheet by causing a plurality of components to operate in cooperation with one another. The operation of each component is controlled individually. When the operation control is not finished normally, the image forming apparatus notifies of occurrence of an abnormality by displaying an error code or transmitting an error code to a call center via a network. A service engineer of the image forming apparatus repairs the image forming apparatus based on the error code. In this manner, service support for recovering the operation of the image forming apparatus to a normal state is operated.

When repairing an image forming apparatus based on an error code, the service engineer appropriately checks a failure of a component related to the error code at the site, and identifies a failure portion required to be repaired. A large amount of time is required for repairing the image forming apparatus, which forces a user to feel inconvenience while the image forming apparatus is being repaired. In Japanese Patent Application Laid-open No. 2005-237046, there is disclosed a method of identifying a failure portion, which involves distinguishing between failures of a high-voltage power supply and a charging wire, to thereby distinguish between a failure of a load and a failure of the apparatus itself. Such a method of identifying a failure portion is used to reduce work hours of repair by the service engineer.

A failure of an image forming apparatus may occur not only in a high-voltage power supply but also in each component inside the apparatus. A large number of error codes to be generated in response to a failure are also prepared. A failure portion identification diagnosis program is prepared in association with each error code in some cases. The failure portion identification diagnosis program is used by the service engineer to check a component related to an operation abnormality, to thereby quickly identify a failure portion. However, when a diagnosis program corresponding to each of a large number of error codes is implemented, a storage region for storing software increases, leading to an increase in cost. The present disclosure has a primary object to provide an image forming apparatus configured to quickly identify a failure portion at low cost.

SUMMARY OF THE INVENTION

An image forming apparatus, according to the present disclosure including: a power supply configured to supply a voltage necessary to form an image; a load operation unit configured to execute an operation for forming an image; a load control unit configured to operate by being supplied with a voltage from the power supply, to thereby control an operation of the load operation unit; a signal output unit configured to operate by being supplied with a voltage from the power supply, to thereby output to the load control unit a control signal for controlling an operation to be executed by the load control unit; a detector configured to detect an abnormality of an operation of the load operation unit; and at least one processor configured to execute failure portion identification processing of identifying a failure portion which is a cause of an abnormality of an operation of the load operation unit by: checking a state of a supply system for the voltage supplied from the power supply when the detector detects the abnormality; checking a state of the signal output unit when there is no failure in the supply system; checking a state of the load control unit when there is no failure portion in the signal output unit; and checking a state of the load operation unit when there is no failure portion in the load control unit.

Further features of the present invention will become apparent from the following description of exemplary embodiments (with reference to the attached drawings).

DESCRIPTION OF THE EMBODIMENTS

An image forming apparatus according to at least one embodiment of the present disclosure is described with reference to the drawings.

Image Forming Apparatus

Figure 1:
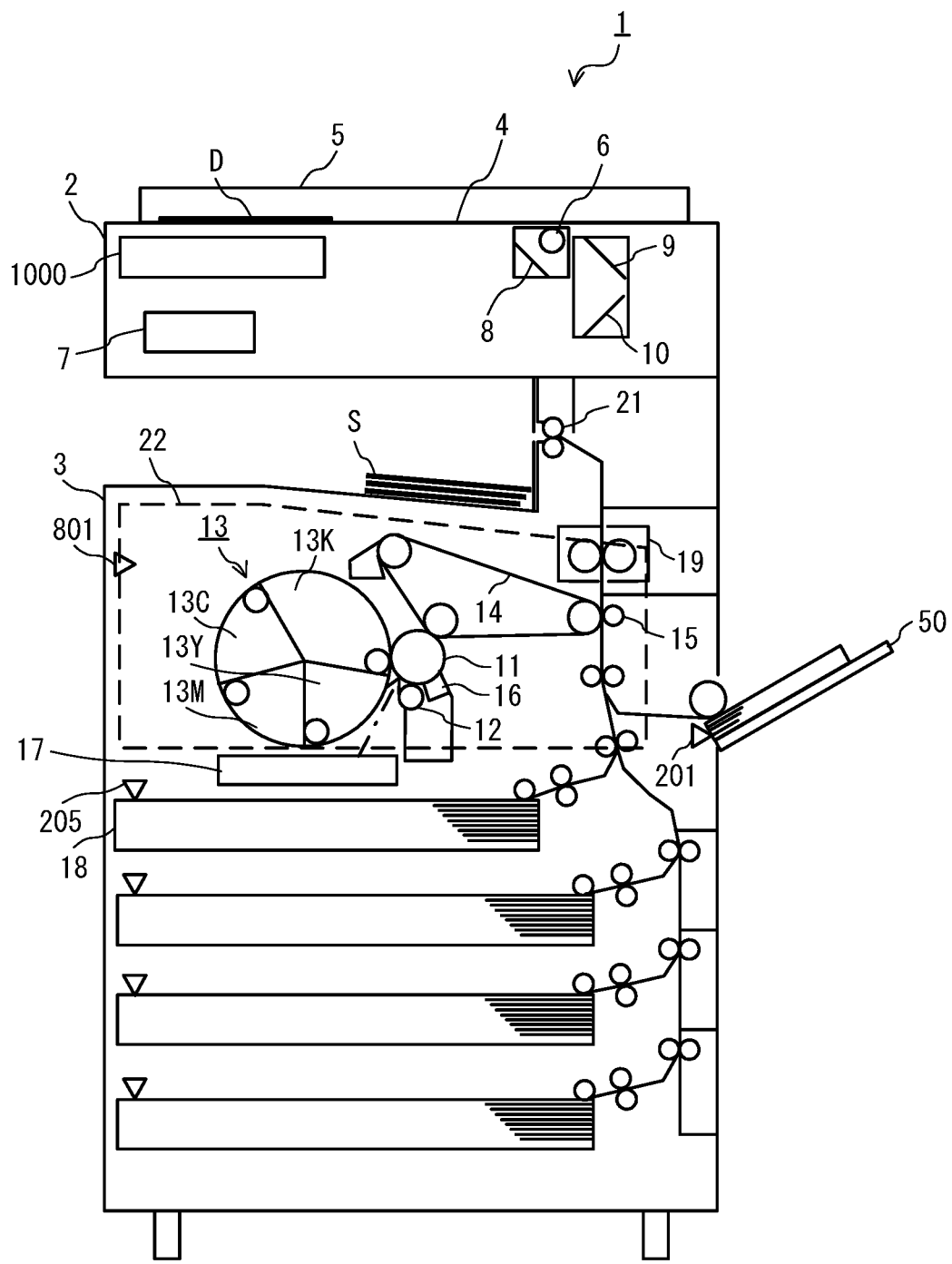
FIG. 1 is a configuration diagram of an image forming apparatus according to at least one embodiment of the present disclosure.

FIG. 1 is a configuration diagram of an image forming apparatus according to at least one embodiment of the present disclosure. The image forming apparatus 1 includes an image reader 2, an image forming unit 3, and an operation unit 1000. The image reader 2 is configured to read a document image from a document D. The image forming unit 3 is configured to form an image on a sheet S. The operation unit 1000 is a user interface including an input device such as a key button or a touch panel and an output device, for example, a display. The image forming apparatus 1 includes a copying function of forming the original image read by the image reader 2 on the sheet S by the image forming unit 3.

The image reader 2 includes, on its upper side, a document table 4 formed of a transparent glass plate and a document pressing plate 5. The document D is placed at a predetermined position on the document table 4 with an image side thereof facing downward. The document pressing plate 5 presses the document D placed on the document table 4 in a fixed manner. A lamp 6 for irradiating the document D with light, an image processing unit 7, and an optical system including reflection mirrors 8, 9, and 10 for guiding an optical image of the irradiated document D to the image processing unit 7 are installed below the document table 4. The lamp 6 and the reflection mirrors 8, 9, and 10 move at a predetermined speed to scan the document D. The image processing unit 7 generates image data representing a document image based on the optical image of the irradiated document D.

In order to form an image, the image forming unit 3 includes components such as a photosensitive drum 11, a primary charging roller 12, a rotary developing unit 13, an intermediate transfer belt 14, a transfer roller 15, a cleaner 16, a laser unit 17, and a fixing device 19. The photosensitive drum 11 is a photosensitive member having a drum shape, and the surface of the photosensitive drum 11 is uniformly charged by the primary charging roller 12. The laser unit 17 acquires image data from the image reader 2, and irradiates the photosensitive drum 11 having the charged surface with laser light whose light emission is controlled in accordance with this image data. With this process, an electrostatic latent image that depends on the image data is formed on the surface of the photosensitive drum.

The rotary developing unit 13 causes toners of respective colors of magenta (M), cyan (C), yellow (Y), and black (K) to adhere to the electrostatic latent image formed on the surface of the photosensitive drum 11, to thereby form a toner image on the surface of the photosensitive drum 11. The rotary developing unit 13 is a developing device of a rotational development system. The rotary developing unit 13 includes a developing device 13K, a developing device 13Y, a developing device 13M, and a developing device 13C, and is rotated by a motor (rotary motor). The developing device 13K is configured to develop an image by a toner of black. The developing device 13Y is configured to develop an image by a toner of yellow. The developing device 13M is configured to develop an image by a toner of magenta. The developing device 13C is configured to develop an image by a toner of cyan.

When a monochrome toner image is to be formed on the photosensitive drum 11, the rotary developing unit 13 develops an image by causing the developing device 13K to rotationally move to a development position close to the photosensitive drum 11. When a full-color toner image is to be formed, the rotary developing unit 13 rotates to arrange the respective developing devices 13Y, 13M, 13C, and 13K at development positions in order, to thereby develop an image by toners of respective colors in order.

The toner image formed on the photosensitive drum 11 by the rotary developing unit 13 is transferred onto the intermediate transfer belt 14 being a transfer member. Toners that remain on the photosensitive drum 11 after the transfer are cleaned by the cleaner 16. The toner image transferred onto the intermediate transfer belt 14 is transferred onto the sheet S by the transfer roller 15. The sheet S is supplied to the transfer roller 15 from a paper cassette 18 or a manual feed tray 50. The image forming apparatus 1 includes a feeding mechanism, for example, a roller, for supplying the sheet S to a conveyance path.

The fixing device 19 is installed on a downstream side of the transfer roller 15 with respect to a conveyance direction of the sheet S. The fixing device 19 fixes the transferred toner image onto the sheet S. The sheet S on which the toner image is fixed is delivered from the fixing device 19 to the outside of the image forming apparatus 1 via a discharge roller pair 21.

The image forming apparatus 1 includes a front door 22, which is openable and closable, in order to enable access to consumables such as the photosensitive drum 11 and the rotary developing unit 13 inside the image forming apparatus 1. The front door 22 is opened at the time of repair or inspection of each component described above inside the image forming apparatus 1 or at the time of replacement of consumables inside the image forming apparatus 1. The image forming apparatus 1 includes a front door open/close sensor 801 for detecting opening/closing of the front door 22.

The image forming apparatus 1 includes a paper cassette opening/closing sensor 205 for detecting opening/closing of each paper cassette 18, and a paper size detection sensor (not shown) configured to detect a size of the sheet S inside the paper cassette 18. When the paper cassette 18 is closed, the paper cassette opening/closing sensor 205 detects this closing. When the paper cassette opening/closing sensor 205 detects closing of the paper cassette 18, the paper size detection sensor automatically detects the size of the sheet S based on the result of detection.

The image forming apparatus 1 includes a manual feed sensor 201 configured to detect whether there is a sheet S on the manual feed tray 50. When the manual feed sensor 201 has detected the fact that the sheet S is placed on the manual feed tray 50, the image forming apparatus 1 displays, on the operation unit 1000, a screen for urging the user to set the size of the placed sheet S. The user sets the sheet size in accordance with the instruction on the screen, to thereby enable the image forming apparatus 1 to recognize the size of the sheet S on the manual feed tray 50.

The configuration of the image forming apparatus 1 is not limited to the above-mentioned configuration, and for example, an image forming apparatus having a well-known configuration in which a plurality of photosensitive drums are arranged along a movement direction of a transfer belt in association with a plurality of color components may be employed.

Control System

Figure 2:
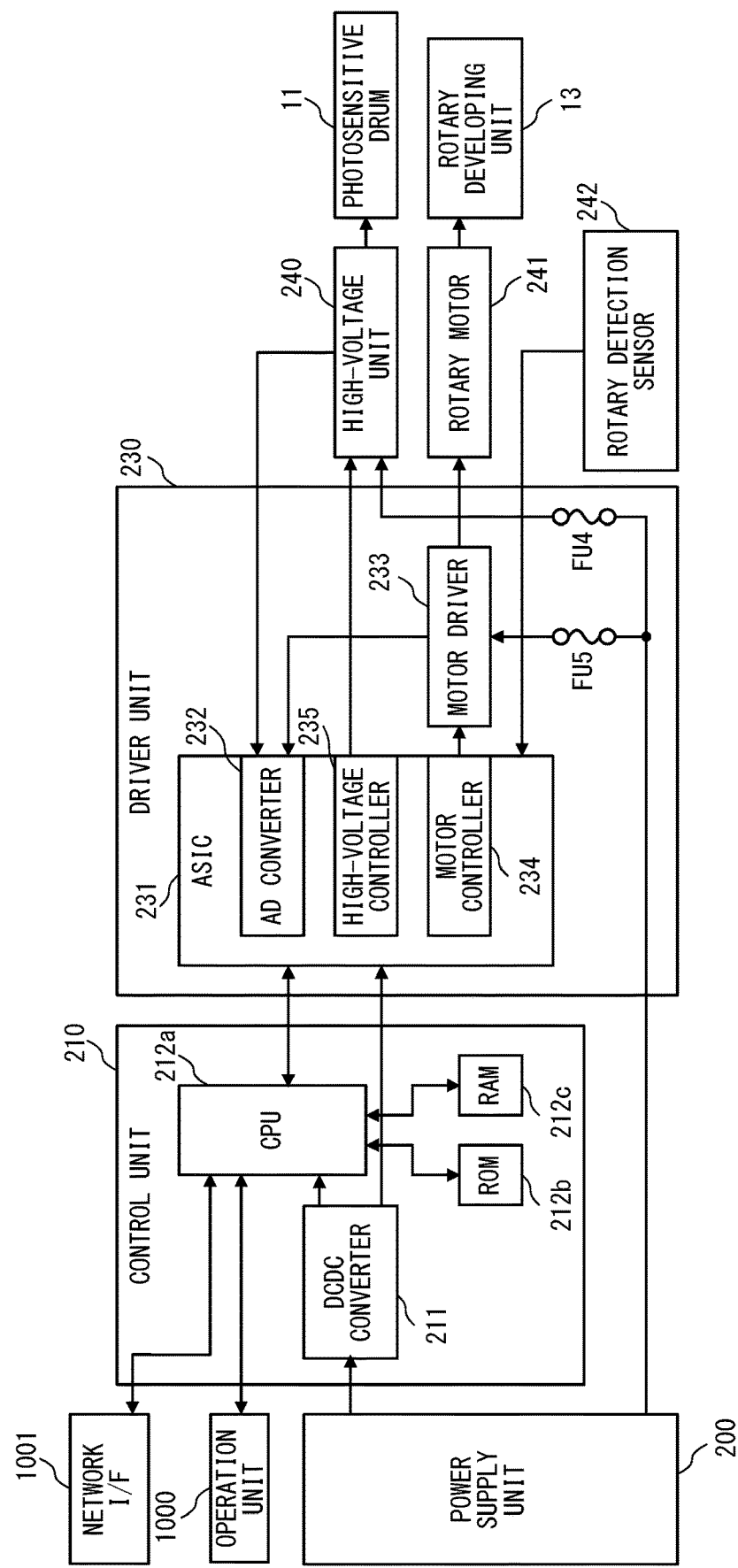
FIG. 2 is an explanatory diagram of a control system for the image forming apparatus.
Figure 3:
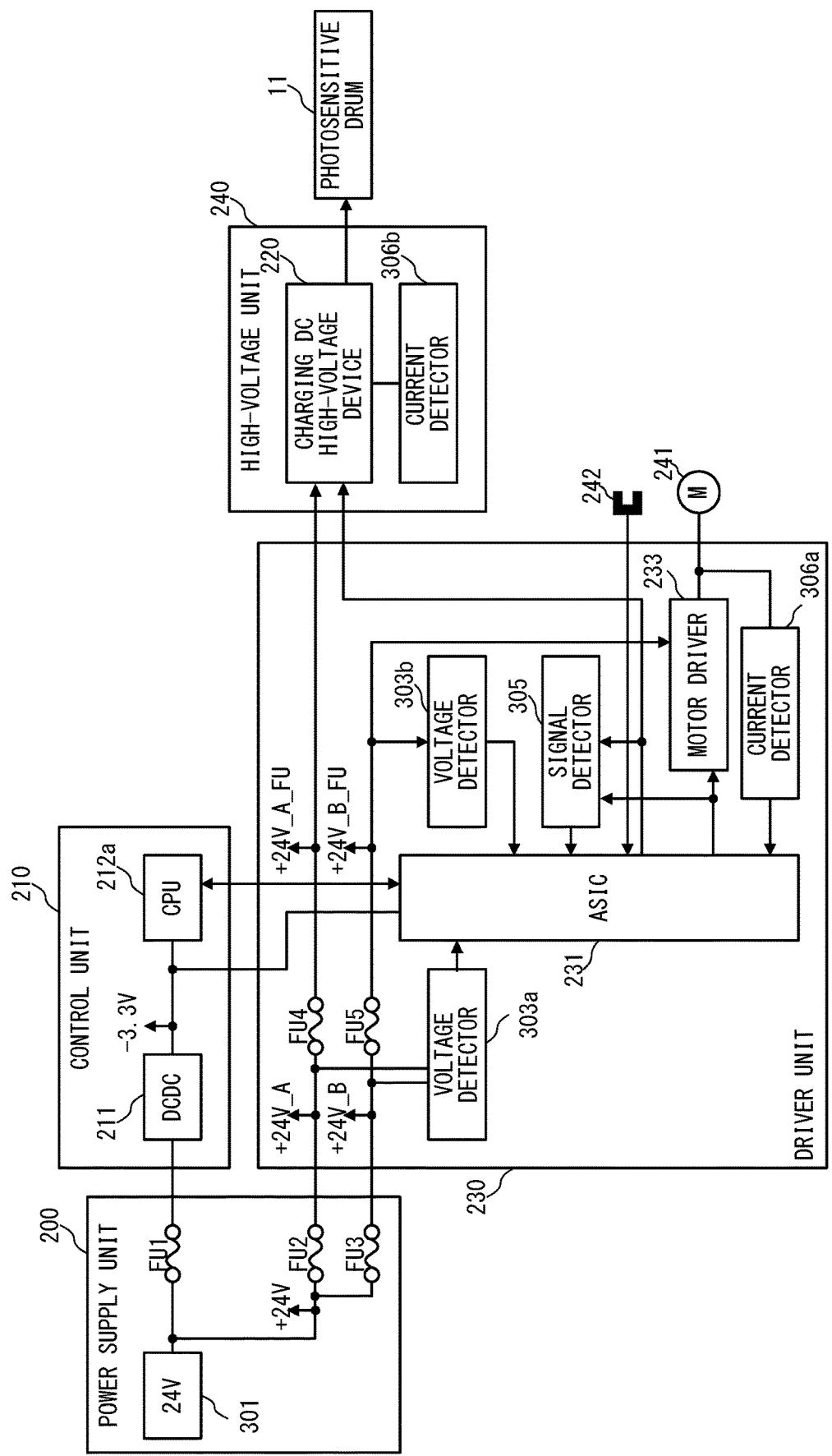
FIG. 3 is an explanatory diagram of the control system for the image forming apparatus.

FIG. 2 and FIG. 3 are explanatory diagrams of a control system for the image forming apparatus 1. Now, a description is given of components configured to control the photosensitive drum 11 and the rotary developing unit 13. This control system controls a charging function of charging the surface of the photosensitive drum 11 and a rotation control function of control rotation of the rotary developing unit 13. The control system includes a power supply unit 200, a control unit 210, a driver unit 230, a high-voltage unit 240, and a rotary motor 241. The power supply unit 200, the control unit 210, the driver unit 230, and the high-voltage unit 240 operate in cooperation with one another to implement the charging function of charging the surface of the photosensitive drum 11. The power supply unit 200, the control unit 210, the driver unit 230, and the rotary motor 241 operate in cooperation with one another to implement the rotation control function of control rotation of the rotary developing unit 13. Components to be driven by a motor driver 233 may be, for example, a motor for rotating the photosensitive drum 11, a motor for driving a conveyance roller configured to convey paper, or a motor for rotating a polygon mirror included in the laser unit 17, in addition to the rotary motor 241. In the control system, a plurality of functions for forming an image in this manner are formed.

A board (first board) of the power supply unit 200 includes fuses FU1, FU2, and FU3. The control unit 210 includes a DC/DC converter 211, a central processing unit (CPU) 212a, a read only memory (ROM) 212b, and a random access memory (RAM) 212c. The driver unit 230 drives the high-voltage unit 240 and the rotary motor 241. To implement this function, a board (second board) of the driver unit 230 includes an application specific integrated circuit (ASIC) 231, the motor driver 233, and fuses FU4 and FU5. Further, in order to identify a failure portion described later, the driver unit 230 includes voltage detectors 303a and 303b, a signal detector 305, and a current detector 306a. Such a control system operates as a power supply, a controller, a signal output device as a signal output unit, a control circuit, and a load operation device as a load operation unit.

Now, a description is given of the power supply. The power supply unit 200 outputs a power supply voltage of +24 V. The power supply unit 200 distributes the power supply voltage to a plurality of voltage supply systems via the fuses HA to FU3, to thereby supply current to each component. The control unit 210 drops the power supply voltage of +24 V, which has been supplied from the power supply unit 200, to a voltage of 3.3 V by the DC/DC converter 211, to thereby supply current to the CPU 212a and the driver unit 230 (ASIC 231), for example. The driver unit 230 supplies the power supply voltage of +24 V, which has been supplied from the power supply unit 200, to the high-voltage unit 240 or the motor driver 233 via the fuses FU4 and FU5.

Now, a description is given of the controller. In the control unit 210, the CPU 212a executes a computer program stored in the ROM 212b, to thereby control an operation of each component and execute various kinds of control sequences relating to image formation. At this time, the RAM 212c is used as a working memory, and stores rewritable data that is required to be stored temporarily or permanently. The RAM 212c stores, for example, a high-voltage set value set in the high-voltage unit 240 or drive setting information on a detachable unit. The CPU 212a performs serial communication to/from the ASIC 231. The CPU 212a uses the serial communication to perform a read/write operation for a register or RAM inside the ASIC 231, to thereby control the operation of the ASIC 231.

Now, a description is given of the signal output device. The signal output device in at least one embodiment is implemented by the ASIC 231. The ASIC 231 includes function modules such as an AD converter 232 for taking in an analog signal value, a high-voltage controller 235 for controlling the high-voltage unit 240, and a motor controller 234 for controlling the rotary motor 241. The ASIC 231 is configured to acquire a set value from the CPU 212a, and set each function module based on the set value. Each function module causes its logic circuit to operate based on the set value, to thereby output a control signal. In at least one embodiment, the high-voltage controller 235 outputs a control signal (high-voltage control signal) for controlling the operation of the high-voltage unit 240. The motor controller 234 outputs a control signal (motor control signal) for controlling the operation of the motor driver 233.

Now, a description is given of the control circuit. The control circuit in at least one embodiment is the high-voltage unit 240 and the motor driver 233. The control circuit is a load controller configured to control the operation of the connected load operation device based on a power supply voltage supplied from the power supply and a control signal acquired from the signal output device.

For example, the motor driver 233 includes a driver integrated circuit (IC) for driving the rotary motor 241. The driver IC controls rotation of the rotary motor 241 based on a motor control signal for driving the rotary motor 241. The rotary motor 241 is rotated to rotate the rotary developing unit 13 being the load operation device. A rotary detection sensor 242 for detecting rotation is provided in the rotary developing unit 13. The rotary developing unit 13 is rotated to cause the rotary detection sensor 242 to transmit to the ASIC 231 a detection result indicating detection of rotation.

The ASIC 231 converts an output signal being an analog signal output from the rotary detection sensor 242 into a digital signal by the AD converter 232, and transmits the digital signal to the CPU 212a. The CPU 212a controls the position of the rotary developing unit 13 based on the acquired digital signal. When the position control is not finished within a predetermined period of time (5 seconds in at least one embodiment), the CPU 212a determines that an abnormality has occurred in the position control of the rotary developing unit 13. That is, the rotary detection sensor 242 detects a control abnormality of the rotary developing unit 13 being the load operation device. A plurality of sensors (abnormality detectors) configured to detect such a control abnormality are provided in association with a plurality of load operation devices, respectively. When occurrence of a control abnormality is determined in this manner, the CPU 212a stops an image forming operation, and executes failure portion identification processing for identifying a failure portion being a cause of the abnormality.

The CPU 212a is connected to the operation unit 1000 and a network interface (I/F) 1001. The CPU 212a acquires an input signal, for example, an instruction from the operation unit 1000, and displays a screen on the operation unit 1000. The CPU 212a performs communication to/from an external device, for example, a computer, by the network I/F 1001 via a predetermined network.

Identification of Failure Portion

Figures 4A, 4B:
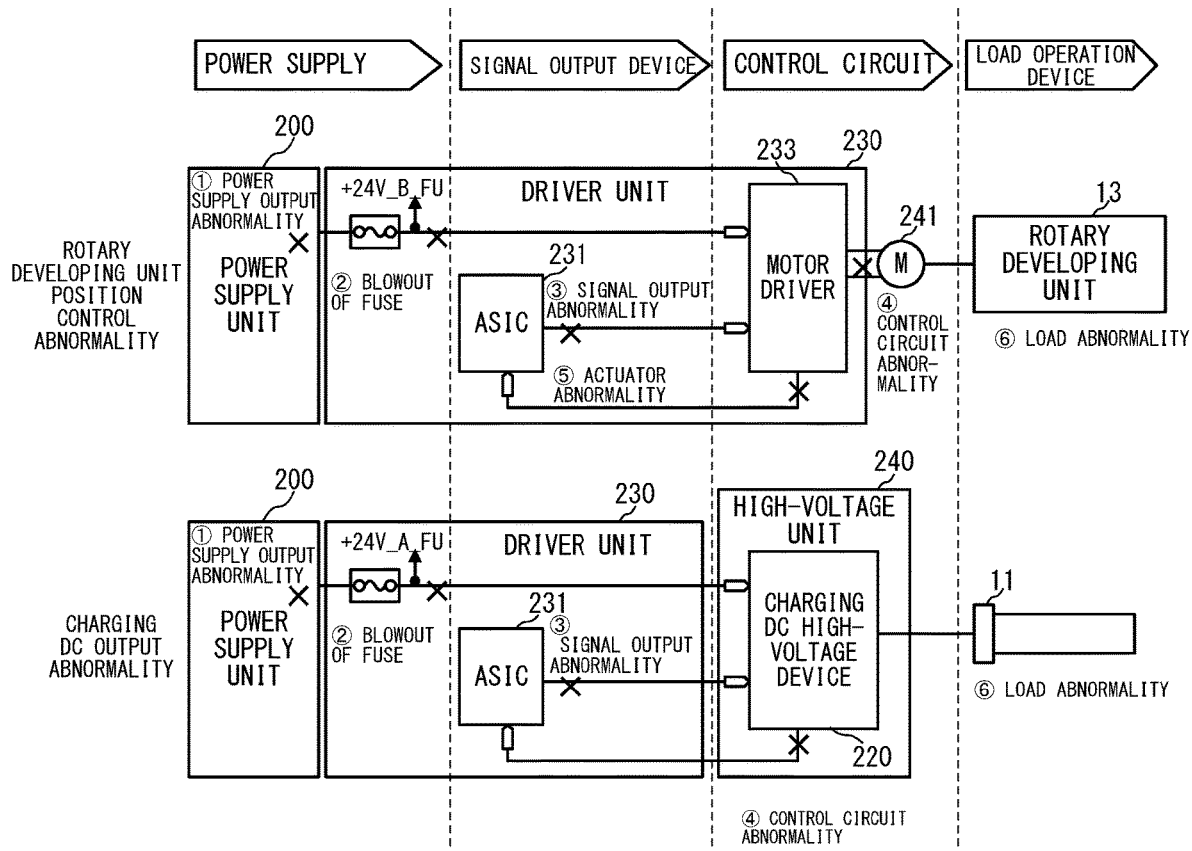
FIG. 4A and FIG. 4B are explanatory diagrams of failure portion identification processing.

FIG. 4A and FIG. 4B are explanatory diagrams of the failure portion identification processing in at least one embodiment. FIG. 4A is a failure portion identification table storing information (failure portion identification information) indicating portions of the power supply, the signal output device, the control circuit, and the load operation device whose states are to be checked for each type of control abnormality. The failure portion identification table is stored in the ROM 212b of the control unit 210. The CPU 212a refers to each piece of failure portion identification information of the failure portion occurrence table at the time of occurrence of a control abnormality, and checks the states of components related to the operation abnormality from items on the left side of the table in order, to thereby identify a failure portion. Parts to be replaced of a portion being the failure portion are referred to as "failure parts". FIG. 4B is an explanatory diagram of the failure portion. Identification of the failure portion is executed in order from the power supply, the signal output device, the control circuit, and the load operation device.

Identification of the failure portion at the time of occurrence of an abnormality of a position control of the rotary developing unit 13 is executed in the following manner. The CPU 212a first starts to check the power supply. As illustrated in FIG. 4A and FIG. 4B, when the abnormality of the position control of the rotary developing unit 13 has occurred, the CPU 212a checks the voltage of +24V_B, which is the input side of the fuse FU5, in order to check the failure portion of the power supply. In order to check the voltage of +24V_B, the voltage detector 303a of the driver unit 230 detects whether a value of the voltage of +24V_B, which is the input side of the fuse FU5, is equal to or larger than a predetermined value (threshold value). In this case, the threshold value is set to 18 V.

The result of detection by the voltage detector 303a is transmitted to the CPU 212a via the ASIC 231. The CPU 212a checks the failure portion based on the result of detection by the voltage detector 303a. When the detection result indicates the fact that the value of the voltage of +24V_B is equal to or larger than 18 V, the CPU 212a determines that the output of +24V_B by the power supply (power supply unit 200) is normal. When the detection result indicates the fact that the value of the voltage of +24V_B is smaller than 18 V, the CPU 212a determines that the output by the power supply (power supply unit 200) is abnormal. When determining that the output by the power supply (power supply unit 200) is abnormal, the CPU 212a confirms that a path (fuse FU3) that outputs the voltage of +24V_B of the power supply unit 200 is the failure portion. The image forming apparatus 1 according to at least one embodiment does not support replacement of only the fuse parts, and replacement is performed in units of boards. Thus, in this case, the CPU 212a identifies the power supply unit 200 as the failure part (parts to be replaced) (an abnormality of power supply output).

When the voltage of +24V_B is normal, the voltage detector 303b of the driver unit 230 detects whether the value of the voltage of +24V_B_FU, which is the output side of the fuse FU5, is equal to or larger than a predetermined value (threshold value). The voltage detector 303b executes detection processing similarly to the voltage detector 303a, and transmits the detection result to the CPU 212a via the ASIC 231. The CPU 212a determines whether the voltage of +24V_B_FU is normal based on the result of detection by the voltage detector 303b. When determining that the voltage of +24V_B_FU is abnormal, the CPU 212a confirms that the fuse FU5 is the failure portion. Similar to the power supply unit 200, replacement of only the fuse parts is not supported, and replacement is performed in units of boards. Thus, in this case, the CPU 212a identifies the driver unit 230 as the failure part (blowout of fuse). When determining that the voltages of +24V_B and +24V_B_FU are normal, the CPU 212a determines that the power supply (power supply system of +24V_B in driver unit 230) is normal.

When the power supply system in the driver unit 230 is normal, the CPU 212a checks the failure portion of the signal output device. In order to check the failure portion of the signal output device, the CPU 212a checks a control signal (motor control signal) transmitted from the motor controller 234 of the ASIC 231 to the motor driver 233. The motor control signal contains signals such as a rotation direction, speed, or drive mode of the rotary motor 241.

In order to check a motor control signal, the CPU 212a first sets the ASIC 231 so that each motor control signal is output at a high level. The signal detector 305 of the driver unit 230 compares the value of each motor control signal with a predetermined threshold value. In this case, the threshold value is set to 2.8 V.

The result of comparison by the signal detector 305 is transmitted to the CPU 212a via the ASIC 231. The CPU 212a checks the output state of a motor control signal based on the result of comparison by the signal detector 305. When the comparison result indicates the fact that the value of the motor control signal is equal to or larger than 2.8 V, the CPU 212a determines that the control signal is normal. When the comparison result indicates the fact that the value of the motor control signal is smaller than 2.8 V, the CPU 212a determines that the control signal is abnormal. When determining that the control signal is abnormal, the CPU 212a identifies the motor controller 234 as the failure portion. In this case, the CPU 212a identifies the driver unit 230 as the failure portion (an abnormality of signal output).

Next, the CPU 212a sets the ASIC 231 so that each motor control signal is output at a low level. The signal detector 305 compares the value of each motor control signal with a predetermined threshold value, to thereby check the control signal. In this case, the threshold value is set to 0.8 V.

The result of comparison by the signal detector 305 is transmitted to the CPU 212a via the ASIC 231. The CPU 212a checks the output state of the motor control signal based on the result of comparison by the signal detector 305. When the comparison result indicates the fact that the value of the motor control signal is smaller than 0.8 V, the CPU 212a determines that the control signal is normal. When the comparison result indicates the fact that the value of the motor control signal is equal to or larger than 0.8 V, the CPU 212a determines that the control signal is abnormal. When determining that the control signal is abnormal, the CPU 212a identifies the motor controller 234 as the failure portion. In this case, the CPU 212a identifies the driver unit 230 as the failure portion (the abnormality of signal output).

When the power supply and the signal output device are normal, the CPU 212a checks the failure portion of the control circuit. In order to check the failure portion of the control circuit, the CPU 212a checks the output of the motor driver 233.

In order to check the output of the motor driver 233, the CPU 212a first sets the motor controller 234 of the ASIC 231 to cause operation of the rotary motor 241. The ASIC 231 (motor controller 234) being the signal output device transmits to the motor driver 233 a motor control signal for causing the operation.

The current detector 306a of the driver unit 230 detects an output current from the control circuit (motor driver 233) under a state in which the power supply voltage and the motor control signal are input to the control circuit (motor driver 233). In order to check whether there is an abnormality of the motor driver 233, the current detector 306a detects whether a value of a current flowing from the motor driver 233 to the rotary motor 241 is equal to or larger than a predetermined value (equal to or larger than threshold value). In this case, the threshold value is set to 100 mA.

The result of detection by the current detector 306a is transmitted to the CPU 212a via the ASIC 231. The CPU 212a checks the failure portion based on the result of detection by the voltage detector 306a. When the detection result indicates the fact that the value of the current flowing through the rotary motor 241 is equal to or larger than 100 mA, the CPU 212a determines that the motor driver 233 is normal. When the detection result indicates the fact that the value of the current flowing through the rotary motor 241 is smaller than 100 mA, the CPU 212a determines that the motor driver 233 is abnormal. When determining that the motor driver 233 has failed, the CPU 212a identifies the control circuit as the failure portion (an abnormality of the control circuit).

At this time, when the rotary motor 241 is in operation, the CPU 212a determines that the driver unit 230 has failed, whereas when the rotary motor 241 is not in operation, the CPU 212a determines that an actuator has failed (an abnormality of the actuator), and identifies the rotary motor 241 as the failure part.

When the power supply, the signal output device, and the control circuit are normal, the CPU 212a checks the failure portion of the load operation device. The CPU 212a executes rotation control of the rotary motor 241 again, to thereby check the load operation device (rotary developing unit 13). In order to check the load operation device, the CPU 212a checks whether the rotary detection sensor 242 detects rotation of the rotary developing unit 13. The CPU 212a acquires the result of detection by the rotary detection sensor 242 via the ASIC 231. When the rotary detection sensor 242 does not detect rotation of the rotary developing unit 13, the CPU 212a determines that the load operation device is abnormal, and identifies the rotary developing unit 13 as the failure portion (an abnormality of the load). In this case, the rotary developing unit 13 is the failure part. When the rotary detection sensor 242 detects rotation of the rotary developing unit 13, the CPU 212a determines that the load operation device is normal. In response to the detection of rotation, the CPU 212a determines that the failure portion cannot be identified.

Next, a description is given of processing of identifying the failure portion at a time when an abnormality of a charging DC output is detected. The abnormality of the charging DC output is an abnormality that occurs when the primary charging roller 12 charges the surface of the photosensitive drum 11. For example, the abnormality of the charging DC output is detected when the surface of the photosensitive drum 11 is not charged to a predetermined voltage value. Whether there is the abnormality of the charging DC output is detected based on a detected value of a current flowing from the high-voltage unit 240 to the photosensitive drum 11 via the primary charging roller 12. This current value is detected by the current detector 306. The primary charging roller 12 charges the surface of the photosensitive drum 11 under control by the high-voltage unit 240.

When the abnormality of the charging DC output has occurred, the CPU 212a first starts to check a failure of the power supply. The CPU 212a checks the voltage of +24V_A, which is the input side of the fuse FU4 installed on the board (second board) of the driver unit 230, to check the failure portion of the power supply. In order to check the voltage of +24V_A, the voltage detector 303a of the driver unit 230 detects whether a value of the voltage of +24V_A, which is the input side of the fuse FU4, is equal to or larger than a predetermined value (threshold value). In this case, the threshold value is set to 18 V.

The result of detection by the voltage detector 303a is transmitted to the CPU 212a via the ASIC 231. The CPU 212a checks the failure portion based on the result of detection by the voltage detector 303a. When the detection result indicates the fact that the value of the voltage of +24V_A is equal to or larger than 18 V, the CPU 212a determines that the output by the power supply (power supply unit 200) is normal. When the detection result indicates the fact that the value of the voltage of +24V_A is smaller than 18 V, the CPU 212a determines that the output by the power supply (power supply unit 200) is abnormal. When determining that the output by the power supply (power supply unit 200) is abnormal, the CPU 212a confirms that a path (fuse FU2) that outputs the voltage of +24V_A of the power supply unit 200 is the failure portion. In this case, the CPU 212a identifies the power supply unit 200 as the failure part (the abnormality of power supply output).

When the voltage of +24V_A is normal, the voltage detector 303b of the driver unit 230 detects whether the value of the voltage of +24V_A_FU, which is the output side of the fuse FU4, is equal to or larger than a predetermined value (threshold value). The voltage detector 303b executes detection processing similarly to the voltage detector 303a, and transmits the detection result to the CPU 212a via the ASIC 231. The CPU 212a determines whether the voltage of +24V_A_FU is normal based on the result of detection by the voltage detector 303b. When determining that the voltage of +24V_A_FU is abnormal, the CPU 212a identifies the fuse FU4 as the failure portion. In this case, the CPU 212a identifies the driver unit 230 as the failure part (blowout of fuse). When determining that the voltages of +24V_A and +24V_A_FU are normal, the CPU 212a determines that the power supply (power supply system of +24V_A in driver unit 230) is normal.

When the power supply system in the driver unit 230 is normal, the CPU 212a checks the failure portion of the signal output device. In order to check the failure portion of the signal output device, the CPU 212a checks a control signal (high-voltage control signal) transmitted from the high-voltage controller 235 of the ASIC 231 to the high-voltage unit 240. The high-voltage control signal contains signals such as an output voltage setting signal, or a clock for transformer driving.

In order to check a high-voltage control signal, the CPU 212a first sets the ASIC 231 so that each high-voltage control signal is output at a high level. The signal detector 305 of the driver unit 230 compares the value of each high-voltage control signal with a predetermined threshold value. In this case, the threshold value is set to 2.8 V.

The result of comparison by the signal detector 305 is transmitted to the CPU 212a via the ASIC 231. The CPU 212a checks the output state of a high-voltage control signal based on the result of comparison by the signal detector 305. When the comparison result indicates the fact that the value of the high-voltage control signal is equal to or larger than 2.8 V, the CPU 212a determines that the control signal is normal. When the comparison result indicates the fact that the value of the high-voltage control signal is smaller than 2.8 V, the CPU 212a determines that the control signal is abnormal. When determining that the control signal is abnormal, the CPU 212a confirms that the high-voltage controller 235 is the failure portion. In this case, the CPU 212a identifies the driver unit 230 as the failure portion (the abnormality of signal output).

Next, the CPU 212a sets the ASIC 231 so that each high-voltage control signal is output at a low level. The signal detector 305 compares the value of each high-voltage control signal with a predetermined threshold value, to thereby check the control signal. In this case, the threshold value is set to 0.8 V.

The result of comparison by the signal detector 305 is transmitted to the CPU 212a via the ASIC 231. The CPU 212a checks the output state of the high-voltage control signal based on the result of comparison by the signal detector 305. When the comparison result indicates the fact that the value of the high-voltage control signal is smaller than 0.8 V, the CPU 212a determines that the control signal is normal. When the comparison result indicates the fact that the value of the high-voltage control signal is equal to or larger than 0.8 V, the CPU 212a determines that the control signal is abnormal. When determining that the control signal is abnormal, the CPU 212a confirms that the high-voltage controller 235 is the failure portion. In this case, the CPU 212a identifies the driver unit 230 as the failure portion (the abnormality of signal output).

When the power supply and the signal output device are normal, the CPU 212a checks the failure portion of the control circuit. In order to check the failure portion of the control circuit, the CPU 212a checks the output of a charging DC high-voltage device 220 inside a board (third board) of the high-voltage unit 240. The charging DC high-voltage device 220 supplies a high voltage to the primary charging roller 12 so as to charge the photosensitive drum 11.

In order to check the output of the charging DC high-voltage device 220, the CPU 212a first sets the high-voltage controller 235 of the ASIC 231 so that the charging DC high-voltage device 220 outputs a predetermined high voltage (−1,000 V in this case). The ASIC 231 (high-voltage controller 235) being the signal output device transmits a high-voltage control signal for outputting a predetermined high voltage to the high-voltage unit 240 (charging DC high-voltage device 220).

The high-voltage unit 240 includes a current detector 306b configured to detect an output current value of the charging DC high-voltage device 220. The current detector 306b detects whether the output current value at a time when the charging DC high-voltage device 220 is outputting a high voltage (−1,000 V) in response to the high-voltage control signal is equal to or larger than a predetermined value (equal to or larger than threshold value). In this case, the threshold value is set to 20 µA.

The result of detection by the current detector 306b is transmitted to the CPU 212a via the ASIC 231. The CPU 212a checks the output state of the high-voltage control signal based on the result of detection by the voltage detector 306b. When the detection result indicates the fact that the output voltage value of the charging DC high-voltage device 220 is smaller than 20 µA, the CPU 212a determines that a control abnormality of the charging DC high-voltage device 220 has occurred. In this case, the CPU 212a confirms that the charging DC high-voltage device 220 is the failure portion. The CPU 212a identifies the high-voltage unit 240 as the failure part (the abnormality of the control circuit). When the detection result indicates the fact that the output current value of the charging DC high-voltage device 220 is equal to or larger than 20 µA, the CPU 212a determines that an abnormality due to short-circuit failure inside the photosensitive drum 11 has occurred. In this case, the CPU 212a identifies the photosensitive drum 11 as the failure part (the abnormality of the load).

Figure 5A:
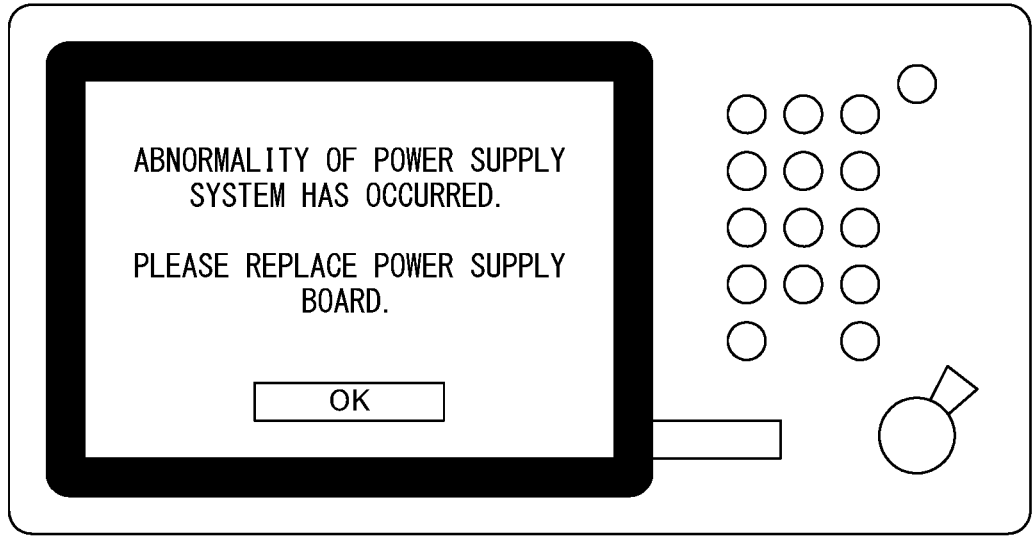
FIG. 5A and FIG. 5B are diagrams for illustrating examples of results of processing to be displayed on an operation portion.
Figure 5B:
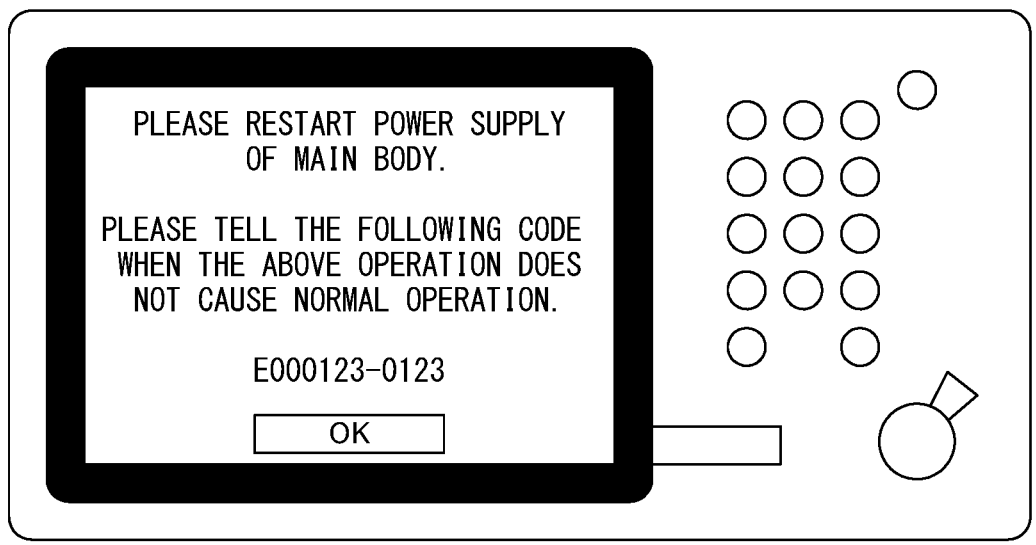

As described above, processing of identifying the failure portion by a similar diagnosis program is executed for each type of control abnormality. After identification of the failure portion, the CPU 212a notifies of the processing result. The CPU 212a notifies of the processing result by displaying the processing result on the operation unit 1000, for example. FIG. 5A and FIG. 5B are diagrams for illustrating examples of results of processing to be displayed on the operation unit 1000. FIG. 5A is a diagram for illustrating an example of display of a processing result in at least one embodiment, and FIG. 5B is a diagram for illustrating an example of display of a processing result in the related art.

In FIG. 5A, the identified failure part is notified. In this example, the fact that the power supply unit 200 (first board) is the failure part and is required to be replaced is displayed on the operation unit 1000. In this manner, in at least one embodiment, contrary to the related-art simple display (FIG. 5B) of an error code indicating a control abnormality, detailed display of displaying a code or message specifically indicating the failure part is enabled. With this detailed display, the service engineer can recover the image forming apparatus 1 from the failure state (error state) within a short period of time by replacing the notified failure part without investigating the failure cause. As a result, it is possible to reduce the downtime of the image forming apparatus 1.

The processing result may be notified to a call center via the network I/F 1001 in addition to display on the operation unit 1000. The failure part is notified to the call center via the network I/F 1001 at the time of occurrence of an abnormality, to thereby enable the service engineer to know the failure part without visiting the installation location of the image forming apparatus 1. As a result, the service engineer can prepare parts for replacement in advance at the time of visiting the installation location, and quickly repair the image forming apparatus 1 to recover the image forming apparatus 1 from the failure state within a short period of time.

In the above-mentioned description of the processing of identifying the failure portion, processing for the signal output device is executed after processing for the power supply. However, this order may be opposite. This is because input from the power supply to the control circuit and input from the signal output device to the control circuit are executed in parallel.

Figure 6:
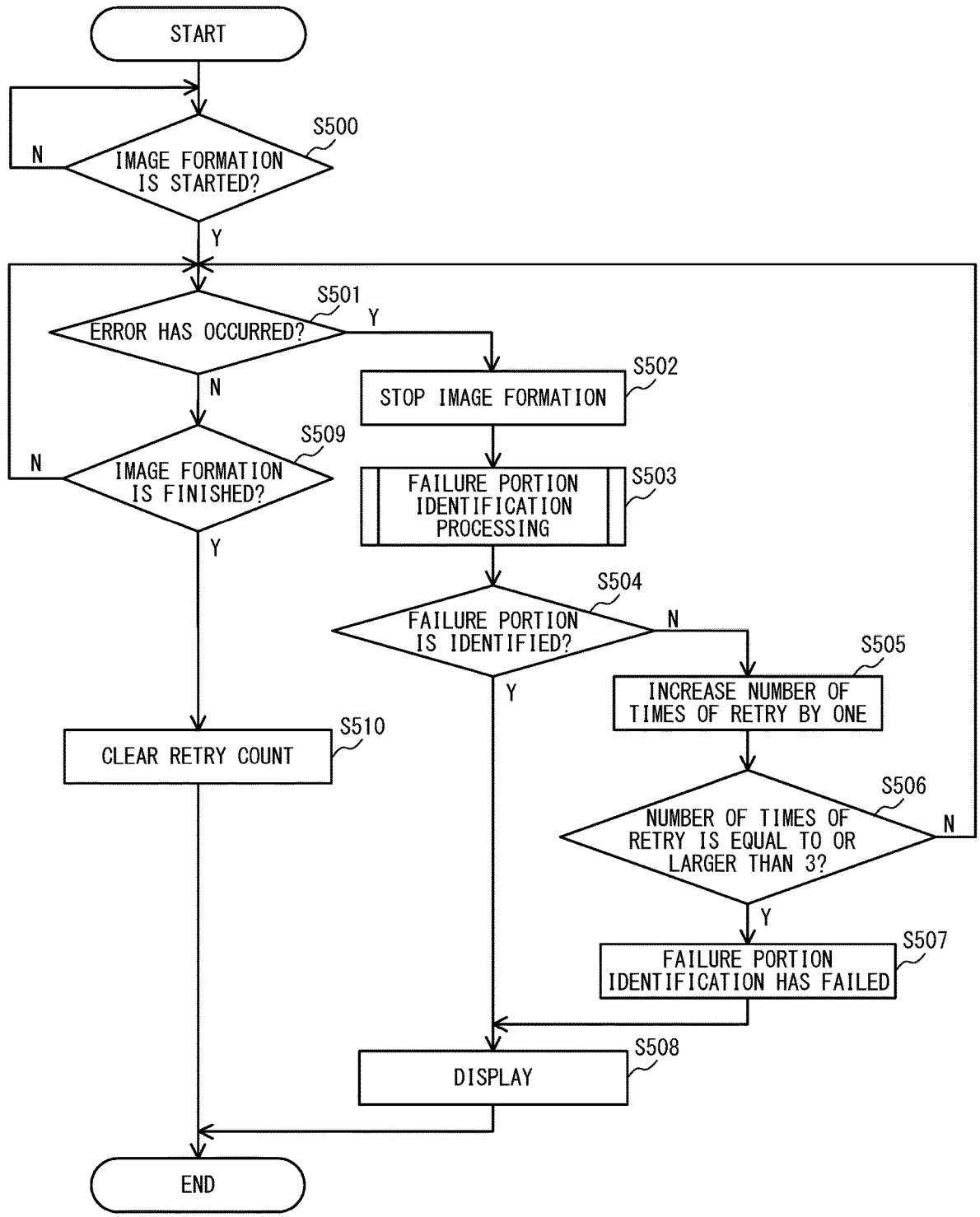
FIG. 6 is a flow chart for illustrating image forming processing including processing of identifying a failure portion.

FIG. 6 is a flow chart for illustrating image forming processing including processing of identifying the failure portion. When an error (control abnormality) has occurred during the image forming processing, the image forming apparatus 1 starts the processing of identifying the failure portion being a cause of the error.

The CPU 212a waits for input of an instruction to start image formation from the user via the operation unit 1000 or the network I/F 1001 (Step S500: N). When an instruction to start image formation is received (Step S500: Y), the CPU 212a starts to form an image in accordance with the instruction. The CPU 212a monitors occurrence of an error due to a control abnormality of each component until the image formation is finished (Step S501: N, and Step S509: N). The CPU 212a monitors occurrence of an error based on the result of detection by various kinds of sensors installed inside the image forming apparatus 1. When an error has occurred, the CPU 212a performs retry that depends on the type of the error. The CPU 212a includes a retry counter configured to count the number of times of retry for each type of an error. When the image formation is finished (Step S509: Y), the CPU 212a clears the number of times of retry for each type of an error stored in the retry counter to all "0" (Step S510). When an error has not occurred or when a control abnormality is resolved by retry after an error has occurred, the image forming processing is finished.

When an error has occurred during the image formation (Step S501: Y), the CPU 212a stops the image formation (Step S502), and executes the processing of identifying the failure portion (Step S503). Now, a description is given of an exemplary case in which an error of not detecting rotation of the rotary developing unit 13 has occurred (the abnormality of the position control of the rotary developing unit 13). The rotary developing unit 13 is rotationally driven by the rotary motor 241. Occurrence of this error is detected when the rotary detection sensor 242 has not detected rotation of the rotary developing unit 13 even after a predetermined period of time has elapsed since the rotary motor 241 started control of rotating the rotary developing unit 13. The processing of identifying the failure portion is started in response to occurrence of the control abnormality of the rotary developing unit 13. The detailed processing procedure of identification of the failure portion is described later.

The CPU 212a determines whether the failure portion is identified by the processing of identifying the failure portion (Step S504). When the failure portion is identified (Step S504: Y), as illustrated in FIG. 5A, the CPU 212a finishes the processing by displaying failures parts to be replaced on the operation unit 1000 (Step S508).

When the failure portion is not identified (Step S504: N), the CPU 212*a* increases the number of times of retry due to an abnormality of a rotary position control by one (Step S505). The CPU 212*a* determines whether the number of times of retry is equal to or larger than a predetermined count (equal to or larger than 3 in this case) (Step S506). When the number of times of retry is smaller than the predetermined count (smaller than 3) (Step S506: N), the CPU 212*a* resumes the image formation to monitor again whether there is occurrence of an error. That is, the CPU 212*a* allows the execution of image formation until an error is detected a predetermined number of times. With this process, the image forming processing is executed again.

When the number of times of retry is equal to or larger than the predetermined count (equal to or larger than 3) (Step S506: Y), the CPU 212*a* determines that the abnormality portion has failed to be identified (Step S507). In this case, the CPU 212*a* displays the fact that the abnormality portion has failed to be identified on the operation unit 1000, and stops the operation of the apparatus under the error state (Step S508). In this case, similarly to the related art, the service engineer investigates the cause of the error.

As described above, the image forming apparatus 1 executes the image forming processing including the processing of identifying the failure portion, and notifies of a failure part when the failure portion is identified.

Figure 7:
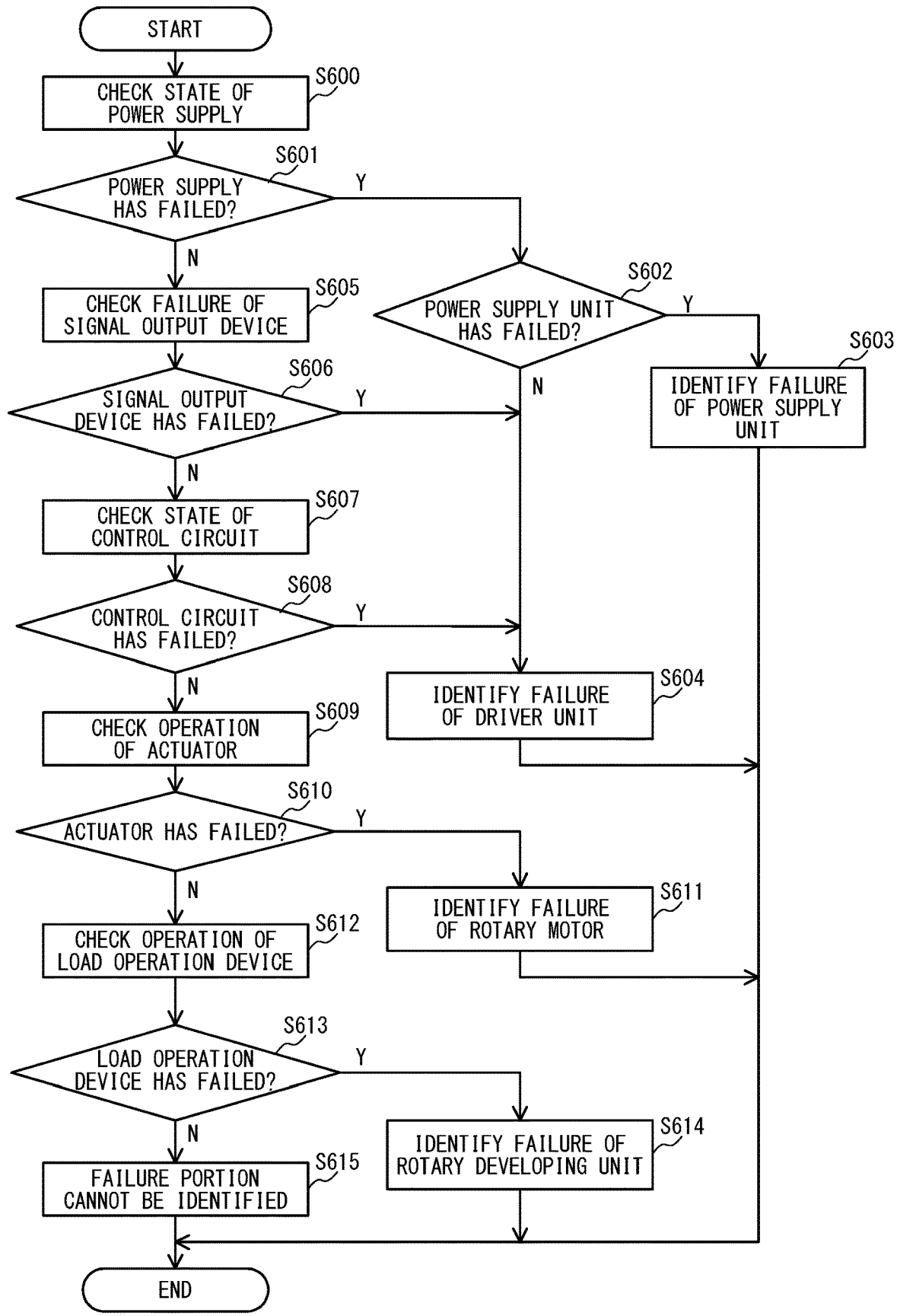
FIG. 7 is a flow chart for illustrating the processing of identifying a failure portion.
Figure 8:
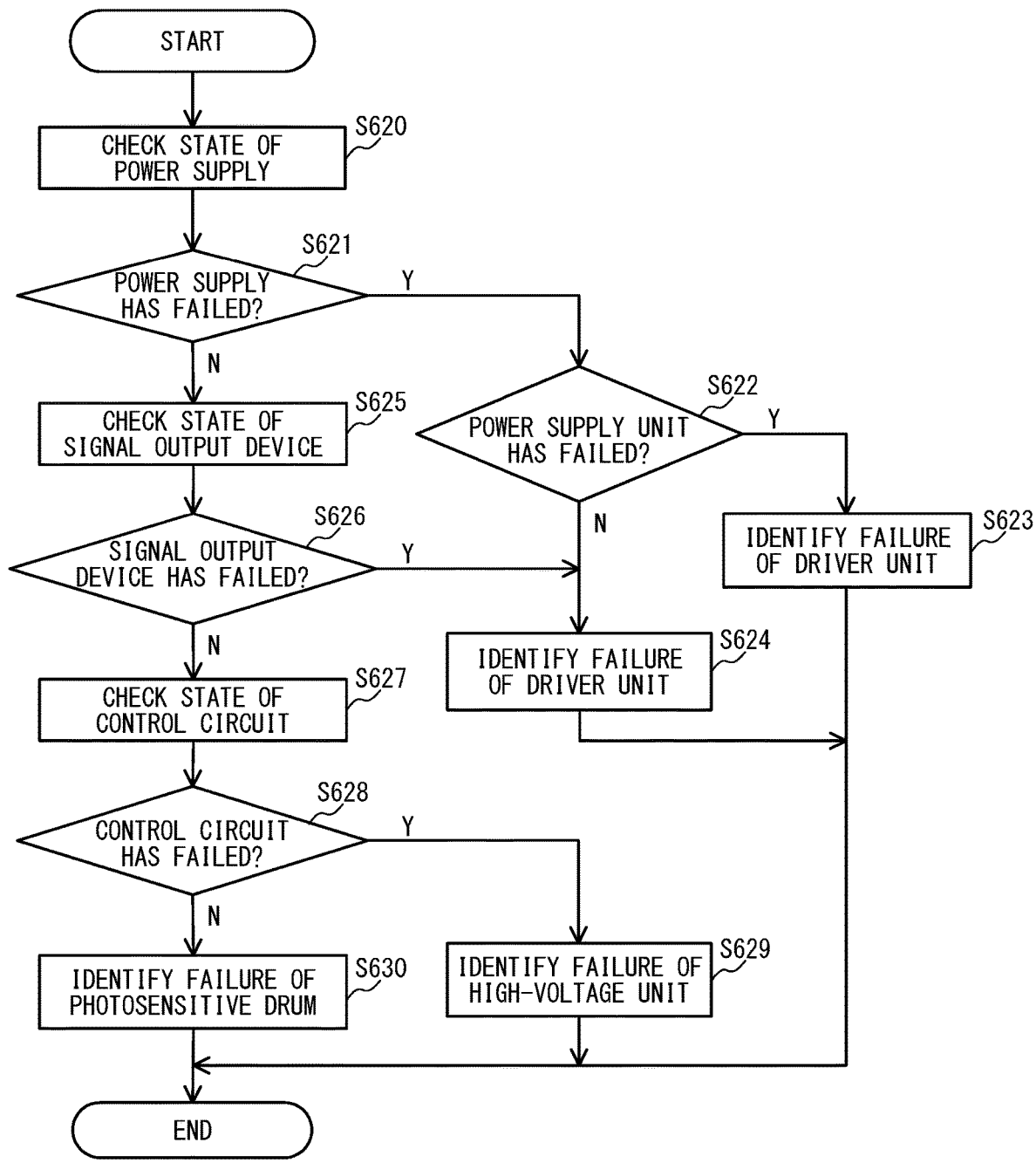
FIG. 8 is a flow chart for illustrating the processing of identifying a failure portion.

FIG. 7 and FIG. 8 are flow charts for illustrating the processing of identifying the failure portion, which is executed in Step S503. FIG. 7 is an illustration of the processing of identifying the failure portion in a case where a control abnormality of the rotary developing unit 13 has occurred. FIG. 8 is an illustration of the processing of identifying the failure portion in a case where the abnormality of the charging DC output has occurred.

Now, a description is given of the processing of identifying the failure portion in a case where an abnormality has occurred in rotation control of the rotary developing unit 13.

The CPU 212*a* first checks the output state of the power supply (Step S600). When there is no output from the power supply, this means that the power supply has failed. When the power supply has failed (Step S601: Y), the CPU 212*a* determines whether the power supply unit 200 (fuse FU3) has failed (Step S602). When the power supply unit 200 has failed (Step S602: Y), the CPU 212*a* identifies the power supply unit 200 as the failure portion (Step S603). When the power supply unit 200 has not failed (Step S602: N), the CPU 212*a* identifies the driver unit 230 (fuse FU5) as the failure portion (Step S604).

When the power supply has not failed (Step S601: N), the CPU 212*a* checks the signal output state of the signal output device (Step S605). When an appropriate signal is not output, this means that the signal output device has failed. When the signal output device has failed (Step S606: Y), the CPU 212*a* identifies the driver unit 230 (motor controller 234) as the failure part because replacement of only the signal output devices is not supported (Step S604). When the signal output device has not failed (Step S606: N), the CPU 212*a* checks the current output state of the control circuit (Step S607). When an appropriate output current is not output, this means that the control circuit has failed. When the control circuit has failed (Step S608: Y), the CPU 212*a* identifies the driver unit 230 (motor driver 233) as the failure part because the motor driver 233 is mounted on the driver unit 230 (Step S604).

When the control circuit has not failed (Step S608: N), the CPU 212*a* checks the operation of the actuator (Step S609). When the actuator has failed (Step S610: Y), the CPU 212*a* identifies the rotary motor 241 as the failure part (Step S611). When the actuator has not failed (Step S610: N), the CPU 212*a* controls the load operation device to operate, and checks the operation of the load operation device (Step S612). When the load operation device has not operated, this means that the load operation device has failed. When the load operation device has failed (Step S613: Y), the CPU 212*a* identifies the rotary developing unit 13 as the failure part (Step S614). When the load operation device has not failed (Step S613: N), the CPU 212*a* determines that the failure portion cannot be identified (Step S615). As a result, "No" is determined in Step S504 of FIG. 6, and the number of times of retry is increased by one in Step S505.

Now, a description is given of the processing of identifying the failure portion in a case where the abnormality of the charging DC output has occurred. The processing of Step S620 to Step S626 of FIG. 8 is similar to the processing of Step S601 to Step S606 of FIG. 7, and thus a description thereof is omitted here.

When the signal output device has not failed (Step S626: N), the CPU 212*a* checks the current output state of the control circuit (Step S627). When an appropriate output current is not output, this means that the control circuit has failed. When the control circuit has failed (Step S628: Y), the CPU 212*a* identifies the high-voltage unit 240 as the failure part because the charging DC high-voltage device 220 configured to output a charging DC is mounted on the high-voltage unit 240 (Step S629). When the control circuit has not failed (Step S628: N), the CPU 212*a* identifies the photosensitive drum 11 as the failure part (Step S630). The processing of identifying the failure portion in the case of the abnormality of the charging DC output skips checking of a failure due to an operation of the load operation device. This is because there is no portion of the load operation device to be determined to have a failure.

As illustrated in FIG. 7 and FIG. 8, after the failure portion has been identified, the CPU 212*a* finishes the processing of identifying the failure portion without checking a failure of a component to be subjected to failure checking. Thus, the CPU 212*a* does not redundantly execute processing of identifying the failure portion for a component to be subjected to failure identification other than the identified failure portion.

In at least one embodiment, a description has been given of the control abnormality of the rotary developing unit 13, but the present disclosure can also be applied to other control targets to be driven by the motor, for example. In the image forming apparatus including a photosensitive member for each of a plurality of color components and an intermediate transfer member, and having a configuration of moving a primary transfer roller for separating the photosensitive members from the intermediate transfer member, the present disclosure can also be applied to, for example, an abnormality of movement of the primary transfer roller.

In the image forming apparatus 1 according to at least one embodiment, identification of a failure portion for a plurality of abnormalities is executed by identifying a failure portion of the power supply, identifying a failure portion of the signal output device, identifying a failure portion of the control circuit, and identifying a failure portion of the load operation device. The failure portion is identified by checking the failure in order from the power supply, the signal output device, the control circuit, and the load operation device. With this process, the failure portion can be identified by the same framework for a large number of errors (control abnormalities), and thus a program for identifying the failure portion is inhibited from becoming complex. Further, a memory capacity required for implementation of the function can be reduced, to thereby quickly identify the failure portion at low cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-207948, filed Nov. 5, 2018 which is hereby incorporated by reference herein in its entirety.

What is claimed is:

1. An image forming apparatus, comprising:
a power supply configured to supply a voltage necessary to form an image;
a load operation unit configured to execute an operation for forming an image, the load operation unit including a first load and a second load which is of a different type from that of the first load;
a load control unit configured to operate by being supplied with a voltage from the power supply, to thereby control an operation of the load operation unit, the load control unit including a first load control unit configured to control an operation of the first load, and a second load control unit configured to control an operation of the second load;
a signal output unit configured to operate by being supplied with a voltage from the power supply, to thereby output to the load control unit a control signal for controlling an operation to be executed by the load control unit, the signal output unit including a first signal output unit configured to output a control signal to the first load control unit, and a second signal output unit configured to output a control signal to the second load control unit;
a detector configured to detect an abnormality of an operation of the load operation unit, the detector including a first abnormality detector configured to detect an abnormality of an operation of the first load, and a second abnormality detector configured to detect an abnormality of an operation of the second load; and
at least one processor configured to execute failure portion identification processing of identifying a failure portion which is a cause of an abnormality of an operation of the load operation unit by:
checking a state of a supply system for the voltage supplied from the power supply in a case where the detector detects the abnormality;
checking a state of the signal output unit in a case where there is no failure in the supply system;
checking a state of the load control unit in a case where there is no failure portion in the signal output unit; and
checking a state of the load operation unit in a case where there is no failure portion in the load control unit.

2. The image forming apparatus according to claim 1, further comprising a storage configured to store a table representing information indicating the power supply, the signal output unit, the load control unit, and the load operation unit, the states of which are to be checked for each type of the abnormality,
wherein the at least one processor is configured to execute the failure portion identification processing by referring to the table in accordance with the load operation unit for which the abnormality is detected by the detector.

3. The image forming apparatus according to claim 1, wherein the at least one processor is configured to identify a failure portion relating to the signal output unit depending on an output state of the control signal.

4. The image forming apparatus according to claim 1, wherein the load control unit is configured to operate the load operation unit by supplying one of a voltage and a current to the load operation unit, and
wherein the at least one processor is configured to identify a failure portion relating to the load control unit in accordance with one of the voltage and the current supplied from the load control unit.

5. The image forming apparatus according to claim 1, wherein the at least one processor is configured to avoid, in a case where the failure portion is identified, executing the failure portion identification processing for a part to be subjected to failure identification other than the identified failure portion.

6. The image forming apparatus according to claim 1, wherein the at least one processor is configured to avoid the failure portion identification processing for a part other than a part to be subjected to the failure identification.

7. The image forming apparatus according to claim 1, further comprising a notifying unit configured to give a notification indicating the failure portion identified by the at least one processor.

8. The image forming apparatus according to claim 7, wherein the notifying unit is configured to give the notification by displaying the failure portion on a predetermined display.

9. The image forming apparatus according to claim 7, further comprising a network interface for communicating to/from an outside device,
wherein the notifying unit is configured to give the notification by transmitting the failure portion to the outside device via the network interface.

10. The image forming apparatus according to claim 1, wherein the at least one processor is configured to, in a case where the failure portion has failed to be identified, allow execution of image formation until the detector detects an abnormality of the load operation unit a predetermined number of times.

11. The image forming apparatus according to claim 1, wherein the at least one processor checks, as the failure portion identification processing, the state of the supply system, the state of the signal output unit, the state of the load control unit and the state of the load operation unit in a case where the detector detected the abnormality regardless of whether it is the first abnormality detector or the second abnormality detector that detected the abnormality.

12. The image forming apparatus according to claim 1, wherein a type of the first load is a motor, and a type of the second load is a high-voltage generating circuit.

13. An image forming apparatus comprising:
a power supply configured to supply a voltage necessary to form an image;
a load operation unit configured to execute an operation for forming an image;
a load control unit configured to operate by being supplied with a voltage from the power supply, to thereby control an operation of the load operation unit;
a signal output unit configured to operate by being supplied with a voltage from the power supply, to thereby output to the load control unit a control signal for controlling an operation to be executed by the load control unit;

a abnormality detector configured to detect an abnormality of an operation of the load operation unit;

a voltage detector configured to detect:
 a voltage value of a supply system to which a voltage is supplied from a first board via a fuse, wherein the power supply is provided on the first board;
 a voltage value of a supply system to which a voltage is supplied via a fuse which is provided on a second board, wherein the signal output unit is provided on the second board, and at least one processor configured to execute failure portion identification processing of identifying a failure portion which is a cause of an abnormality of an operation of the load operation unit by:
 checking a state of a supply system for the voltage supplied from the power supply in a case where the detector detects the abnormality;
 checking a state of the signal output unit in a case where there is no failure in the supply system;
 checking a state of the load control unit in a case where there is no failure portion in the signal output unit; and
 checking a state of the load operation unit in a case where there is no failure portion in the load control unit, wherein the at least one processor is configured to identify a failure portion of the supply system based on the voltage values detected by the voltage detector.

14. The image forming apparatus according to claim 13, wherein the at least one processor is configured to:
 detect a voltage value of a voltage output from the first board via the fuse; and
 detect a voltage value of a voltage input via the fuse included in the second board, in a case where the detected voltage value is normal.

\* \* \* \* \*